US012461908B2

(12) United States Patent
Chowdhary et al.

(10) Patent No.: US 12,461,908 B2
(45) Date of Patent: Nov. 4, 2025

(54) SYSTEM AND METHOD FOR PERSONALIZING LARGE LANGUAGE MODELS IN QUERY SYSTEMS

(71) Applicant: INTUIT INC., Mountain View, CA (US)

(72) Inventors: Pooja Rajan Chowdhary, Mountain View, CA (US); Pratik Lala, Mountain View, CA (US); James Odeyale, Mountain View, CA (US); Jonathan Lin, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 18/651,598

(22) Filed: Apr. 30, 2024

(65) Prior Publication Data

US 2025/0335431 A1 Oct. 30, 2025

(51) Int. Cl.

*G06F 16/242* (2019.01)
*G06F 16/2457* (2019.01)
*G06F 16/248* (2019.01)

(52) U.S. Cl.

CPC .... *G06F 16/2425* (2019.01); *G06F 16/24575* (2019.01); *G06F 16/248* (2019.01)

(58) Field of Classification Search

CPC ........... G06F 16/2425; G06F 16/24575; G06F 16/248

See application file for complete search history.

(56) References Cited

U.S. PATENT DOCUMENTS

| | | | | |
|---|---|---|---|---|
| 12,038,958 | B1 * | 7/2024 | Soubbotin | G06F 16/335 |
| 12,298,975 | B2 * | 5/2025 | Baldua | G06F 16/243 |
| 2024/0220735 | A1 * | 7/2024 | Gray | G06F 40/56 |
| 2024/0362286 | A1 * | 10/2024 | He | G06F 16/93 |
| 2024/0378399 | A1 * | 11/2024 | Gandhi | G06F 16/345 |
| 2025/0005303 | A1 * | 1/2025 | Gray | G06F 16/3328 |
| 2025/0061303 | A1 * | 2/2025 | Sun | G06N 3/096 |
| 2025/0063029 | A1 * | 2/2025 | Wen | H04L 51/216 |
| 2025/0077511 | A1 * | 3/2025 | Zhao | G06F 16/252 |
| 2025/0133038 | A1 * | 4/2025 | Shang | H04L 51/02 |
| 2025/0147991 | A1 * | 5/2025 | Zang | G06F 16/31 |

OTHER PUBLICATIONS

Witteveen et al., "Paraphrasing with Large Language Models", Proceedings of the 3rd Workshop on Neural Generation and Translation, Nov. 2019, pp. 215-220.

* cited by examiner

*Primary Examiner* — Jorge A Casanova
(74) *Attorney, Agent, or Firm* — DLA PIPER LLP US

(57) ABSTRACT

A system and method are provided for personalizing large language models in query systems.

18 Claims, 5 Drawing Sheets

SYSTEM AND METHOD FOR PERSONALIZING LARGE LANGUAGE MODELS IN QUERY SYSTEMS

BACKGROUND OF THE DISCLOSURE

With the recent emergence of generative artificial intelligence (AI), there has been explosive growth in automating the creation of content, data, and models. The fast-paced research and development in the space of large language models (LLMs) has led to such growth. Some of the most prominent use cases of generative AI have been for content creation, augmentation, personalization, simulation and modeling, and enhancing human creativity. In addition, many organizations may use LLMs within question-and-answer ("QnA") platforms, such as those provided to their users or employees. For example, when users need assistance with a service (e.g., banking, accounting, taxes, shopping, etc.), they frequently will interact with a QnA platform (e.g., QnA search, chatbot, etc.), which enables the users to ask questions without having to talk to a human over the telephone. In addition, when employees need assistance with an internal problem (e.g., internal software development), they will also interact with a QnA platform.

However, answers provided by LLMs are not always in the format desired by the user. In particular, the LLM answers are generally catered to the level of detail of the documentation, rather than the level of expertise of the user, which is undesirable. Additionally, the output from the LLM is not formatted in line with the user's expectations, which is also undesirable.

The drawings are not necessarily to scale, or inclusive of all elements of a system, emphasis instead generally being placed upon illustrating the concepts, structures, and techniques sought to be protected herein.

DESCRIPTION

The following detailed description is merely exemplary in nature and is not intended to limit the claimed invention or the applications of its use.

Embodiments of the present disclosure relate to a system and method for personalizing LLMs in query systems. In particular, the disclosed principles integrate a persona-based detection system that allows users to give real-time feedback on responses provided by an LLM. For example, once the user receives an LLM output displayed on his/her device, the disclosed system provides an option requesting a rephrase or reformatting of the output. The reformatting can be persona-based, taking into account specific characteristics of the user in order to provide desired reformatting options. By providing these options, the disclosed system and methods can ensure that users are more satisfied with the responses they receive from LLMs and can obtain the information they desire in a format that suits their preferences.

Figure 1:
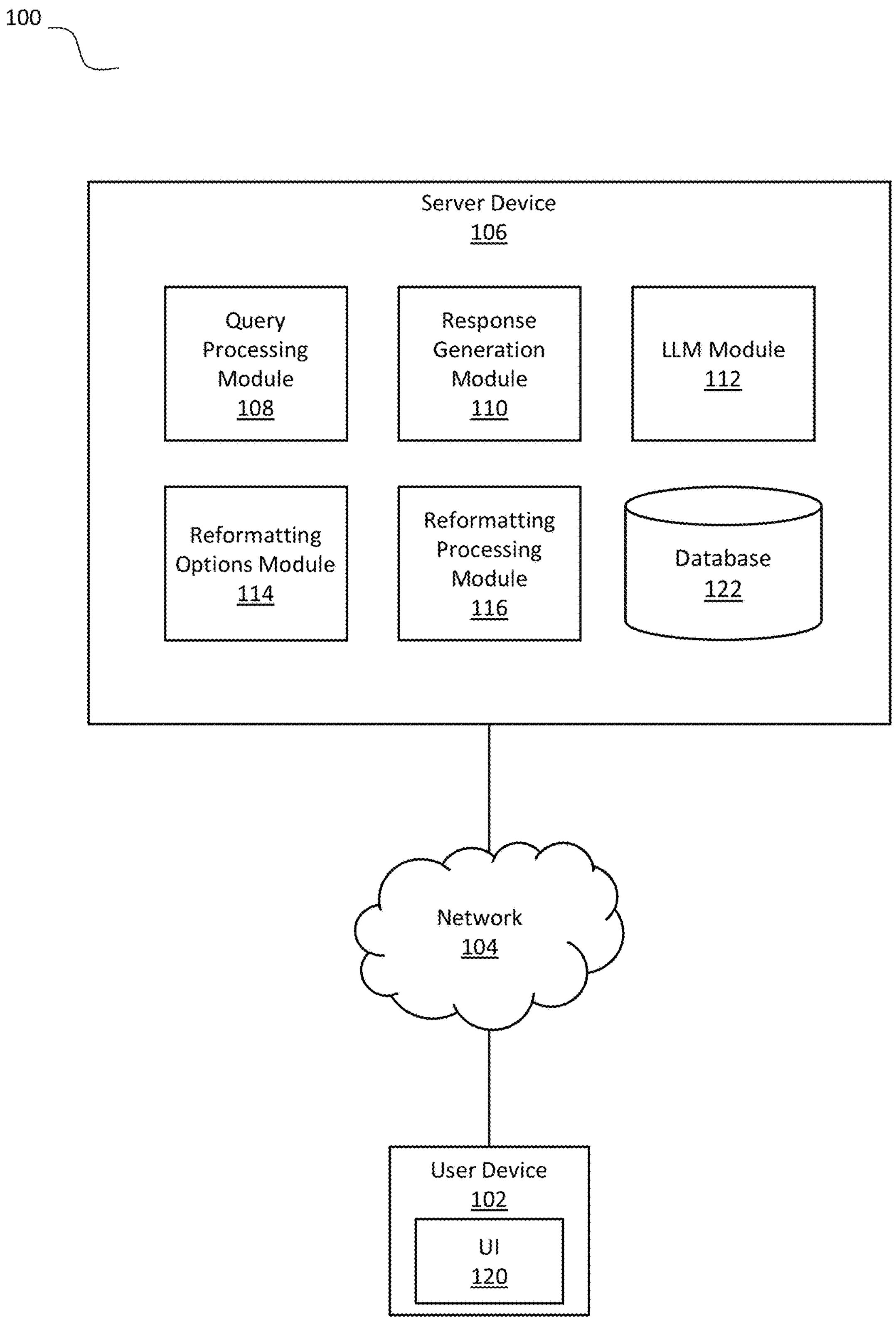
FIG. 1 is a block diagram of an example system for personalizing LLMs in query systems according to example embodiments of the present disclosure.

FIG. 1 is a block diagram of an example system 100 for personalizing LLMs in query systems according to example embodiments of the present disclosure. The system 100 can include one or more user devices 102 (generally referred to herein as a "user device 102" or collectively referred to herein as "user devices 102") that can access, via network 104, a query system managed by a server device 106. This connection enables a user (e.g., a developer) operating the user device 102 to utilize a user interface (UI) 120 to consult the query system on the server 106. For example, the user can transmit a query or question via the UI 120 that is transmitted to the server 106 for analysis. The server 106, via its various modules, generates a response and transmits it back to the user device 102 for display to the user on the UI 120. For example, the query system could be a part of various online services, such as a developer assist tool.

A user device 102 can include one or more computing devices capable of receiving user input, transmitting and/or receiving data via the network 104, and or communicating with the server 106. In some embodiments, a user device 102 can be a conventional computer system, such as a desktop or laptop computer. Alternatively, a user device 102 can be a device having computer functionality, such as a personal digital assistant (PDA), a mobile telephone, a smartphone, tablet, or other suitable device. In some embodiments, a user device 102 can be the same as or similar to the computing device 400 described below with respect to FIG. 4. In some embodiments, the system 100 can include any number of user devices 102.

The network 104 can include one or more wide areas networks (WANs), metropolitan area networks (MANs), local area networks (LANs), personal area networks (PANs), or any combination of these networks. The network 104 can include a combination of one or more types of networks, such as Internet, intranet, Ethernet, twisted-pair, coaxial cable, fiber optic, cellular, satellite, IEEE 801.11, terrestrial, and/or other types of wired or wireless networks. The network 104 can also use standard communication technologies and/or protocols.

The server 106 may include any combination of one or more of web servers, mainframe computers, general-purpose computers, personal computers, or other types of computing devices. The server 106 may represent distributed servers that are remotely located and communicate over a communications network, or over a dedicated network such as a local area network (LAN). The server 106 may also include one or more back-end servers for carrying out one or more aspects of the present disclosure. In some embodiments, the server 106 may be the same as or similar to server 300 described below in the context of FIG. 3.

As shown in FIG. 1, the server 106 includes a query processing module 108, a response generation module 110, an LLM module 112, a reformatting options module 114, and a reformatting processing module 116. The server 106 can also include a database 122 that is configured to store and maintain a knowledge base of information relevant to certain specialty areas. For instance, in the field of tax and accounting, the database 122 can include a plurality of tax forms, tax instructions, business tax-related documents (e.g., for U.S. states), tax data models, tax calculation logics, interview files, etc. In some embodiments, the database 122 can be a vector database to enable vector searches to be performed to identify relevant documents and materials. One such example is a Chroma Database. In some embodiments, the database 122 can employ one or more of indexing and querying techniques that can be used for hierarchical clustering or partitioning. The use of such indexing and querying techniques can enable parallel processing, caching, and prefetching, which can minimize latency to store frequently accessed data in memory. Moreover, this can provide data compression and efficient storage without sacrificing query performance with fault tolerance and recovery.

In some embodiments, the query processing module 108 is configured to receive user queries from the user device 102. In some embodiments, the query processing module 108 is configured to initiate preprocessing of the query to categorize it under the most relevant category. In addition, based on the categorization, the query processing module 108 can direct the query to a specific tool best suited for its resolution.

In some embodiments, the response generation module 110 is configured to process the received query to generate a response to the query. In particular, the response generation module 110 is configured to use the knowledge base contained within the database 122 to generate a response to the user query. In some embodiments, the response generation module 110 is configured to utilize various search techniques to identify a response to the query from the database 122. For example, the response generation module 110 can perform semantic/hybrid vector searches within the database 122 to identify documents relevant to the query. In some embodiments, the response generation module 110 can use a combination of cosine similarity and machine learning-based ranking within the vector store. In addition, the response generation module 110 can use various other vector search techniques, such as e.g., Euclidean distance, Manhattan distance, and Jaccard similarity. The response generation module 110 can also use various machine learning algorithms, such as e.g., support vector machines, random forests, and neural networks, to rank the vectors in the vector store.

In some embodiments, the LLM module 112 includes an LLM, such as e.g., GPT-3, -3.5, -4, PaLM, Ernie Bot, LLaMa, and others. In some embodiments, an LLM can include various transformed-based models trained on vast corpuses of data that utilize an underlying neural network. The LLM module 112 can receive an input, such as a user query and documentation and material that has been identified as being relevant to the query. The LLM module 112 is configured to analyze the input and generate a response to the initial user query. In particular, the LLM module 112 is configured to summarize the results of the initial model to generate the user query response.

In some embodiments, the reformatting options module 114 is configured to determine one or more reformatting options associated with the response to a user query and cause the options to be displayed on the user device via the UI 120. To enhance the overall usability of the response generated by the LLM module 112, the reformatting options module 114 is configured to develop and determine persona-based reformatting options that cater to different user preferences. For example, non-technical personas such as product managers may not be interested in viewing code snippets and may prefer a summary of the key points in non-technical language. Alternatively, technical personas such as developers may likely require access to code for debugging or implementation purposes. Therefore, to account for such differences in preferences, the reformatting options module 114 is configured to analyze the persona of the user associated with the query in determining reformatting options. This can include identifying the user persona (e.g., product managers, developers, etc.) and presenting the appropriate format based on his/her preferences. In addition, this can include scanning the content and detecting the components that may require reformatting, such as a block of text, a code snippet, or even specific terminologies or jargon. In one example, if the LLM module 112 response contains code blocks, the disclosed system can perform language detection. Based on this detection, the reformatting options module 114 can present code-based dropdown options to personas that are interested in technical details, such as developers. If the LLM module 112 response contains a text block, the reformatting options module 114 can present a non-technical summarization drop-down option to personas such as product managers.

In addition, the reformatting options module 114 is configured to reformat a message (i.e., the response generated by the LLM module 112) based on the reformatting option selected by the user via UI 120. In some embodiments, this can include leveraging the LLM module 112 to perform the reformatting. For example, when the user requests reformatting a code block in a different programming language, the reformatting options module 114 can cause the LLM module 112 to adjust the code accordingly. Additionally, the LLM module 112 can detect and reformat content based on language style, academic level, or technical complexity according to the user's preference.

In some embodiments, the reformatting processing module 116 is configured to process the selected reformatting option to identify the specific material that requires reformatting. In some embodiments, the reformatting processing module 116 can review the conversation history to identify the specific message to be reformatted. In some embodiments, the reformatting processing module 116 can focus on more recent responses from the LLM module 112.

Figure 2A:
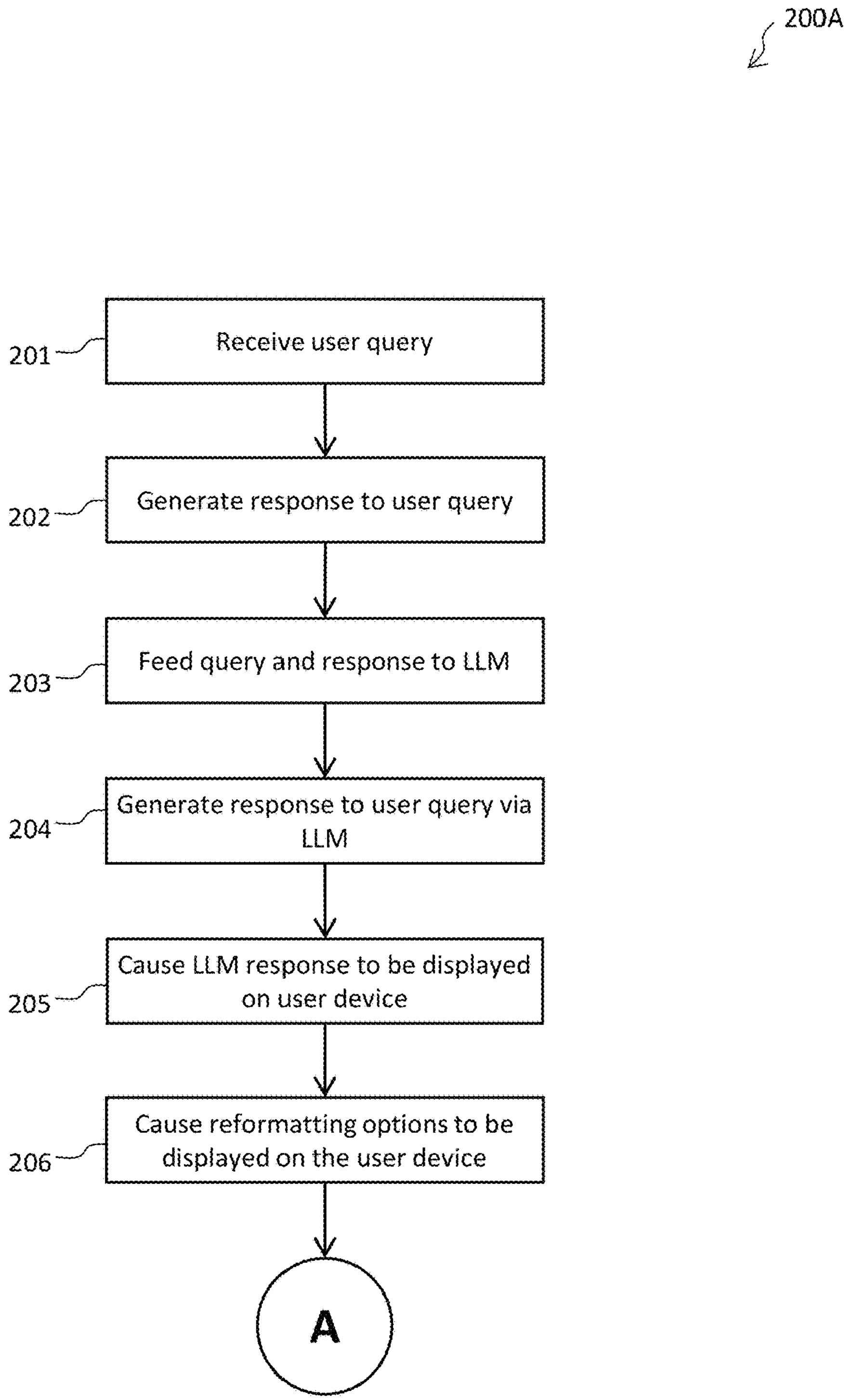
FIGS. 2A and 2B are flowcharts of example processes for personalizing LLMs in query systems according to example embodiments of the present disclosure.
Figure 2B:
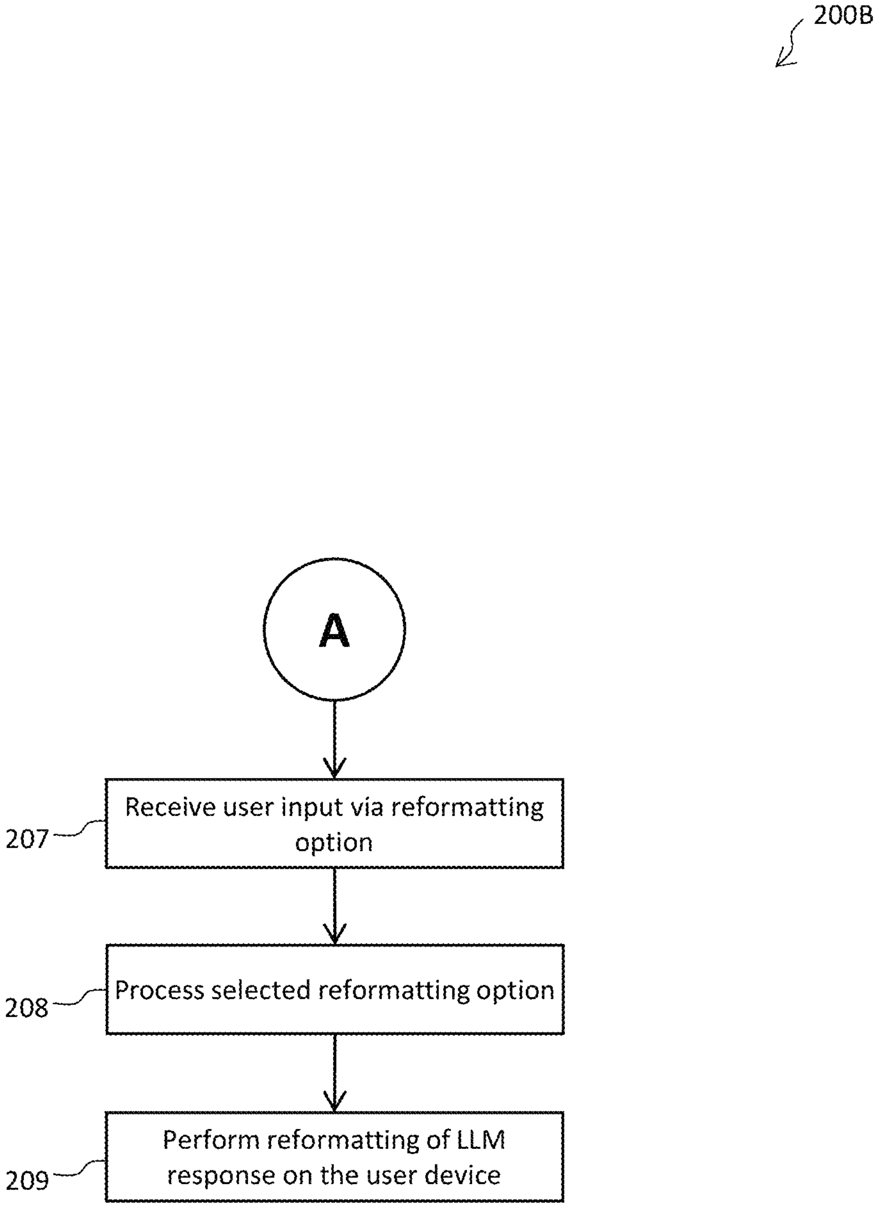

FIGS. 2A and 2B are flowcharts of example processes 200A and 200B for personalizing LLMs in query systems according to example embodiments of the present disclosure. In some embodiments, the process 200A of FIG. 2A can be performed by the server 106 in conjunction with a user, via user device 102, accessing a query system to present a query. For example, a user may have an interface executing on the user device 102 via UI 120 where he/she will type a question and submit it to the server 106.

At block 201, the query processing module 108 receives a user query from the user device 102. In some embodiments, the query can include a specific question, a request for documentation or code examples, or a request for general guidance, although these are not limiting and are merely exemplary in nature. At block 202, the response generation module 110 generates a response to the user query. In some embodiments, the response to the query can be based on a knowledge base of information, such as the information stored within the database 122. In some embodiments, generating the response to the user query can include utilizing one or more search techniques to identify relevant documents and materials from within the database 122. For example, the response generation module 110 can vectorize the user query and run a semantic/hybrid vector search technique within the database 122 to identify relevant documents. In some embodiments, the response generation module 110 can additionally or alternatively use a combination of cosine similarity and machine learning-based ranking within the vector store. In addition, the response generation module 110 can use various other vector search techniques, such as e.g., Euclidean distance, Manhattan distance, and Jaccard similarity. The response generation module 110 can also use various machine learning algorithms, such as e.g., support vector machines, random forests, and neural networks, to rank the vectors in the vector store.

At block 203, the response generation module 110 feeds the query and the generated response as an input to the LLM module 112. At block 204, the LLM module 112 generates a response to the user query by analyzing the received input. For example, the LLM module 112 can summarize the results identified by the response generation module 110 to generate the user query response (referred to as the "LLM response" or a "summarized response"). At block 205, the server 106 causes the LLM response to be displayed on the user device 102 via the UI 120. At block 206, the reformatting options module 114 causes one or more reformatting options to be displayed on the user device 102 via the UI 120. In some embodiments, this can include determining persona-based reformatting options that cater to different user preferences. For example, the reformatting options module 114 can analyze the persona of the user associated with the query in determining the one or more reformatting options. As noted above, this can include identifying the user persona (e.g., product managers, developers, etc.) and presenting the appropriate format based on his/her preferences. In addition, this can include scanning the content and detecting the components that may require reformatting, such as a block of text, a code snippet, or even specific terminologies or jargon. In one example, if the LLM module 112 response contains code blocks, the disclosed system can perform language detection. Based on this detection, the reformatting options module 114 can present code-based dropdown options to personas that are interested in technical details, such as developers. If the LLM module 112 response contains a text block, the reformatting options module 114 can present a non-technical summarization drop-down option to personas such as product managers.

In some embodiments, the process 200B of FIG. 2B can also be performed by the server 106 in conjunction with a user, via user device 102, accessing a query system to present a query. For example, a user may have an interface executing on the user device 102 via UI 120 where he/she will type a question and submit it to the server 106. In addition, the various reformatting options have been determined and displayed on the user device. At block 207, the reformatting processing module 116 receives a user input via the displayed reformatting options. For example, the user may select, via the UI 120, one of the reformatting options that is displayed, such as an option to receive a snippet of code or an option to receive a textual description of a snippet of code.

At block 208, the reformatting processing module 116 processes the selected reformatting option. In some embodiments, processing the selected reformatting option can include identifying the specific material that requires reformatting. In some embodiments, the reformatting processing module 116 can review the conversation history to identify the specific message to be reformatted. In some embodiments, the reformatting processing module 116 can focus on more recent responses from the LLM module 112. At block 209, the reformatting options module 114 performs the reformatting of the LLM response on the user device. In some embodiments, this can include leveraging the LLM module 112 to perform the reformatting. For example, as discussed above, when the user requests reformatting a code block in a different programming language, the reformatting options module 114 can cause the LLM module 112 to adjust the code accordingly. Additionally, the LLM module 112 can detect and reformat content based on language style, academic level, or technical complexity according to the user's preference. The reformatted LLM response is then displayed to the user device 102 via the UI 120.

Figure 3:
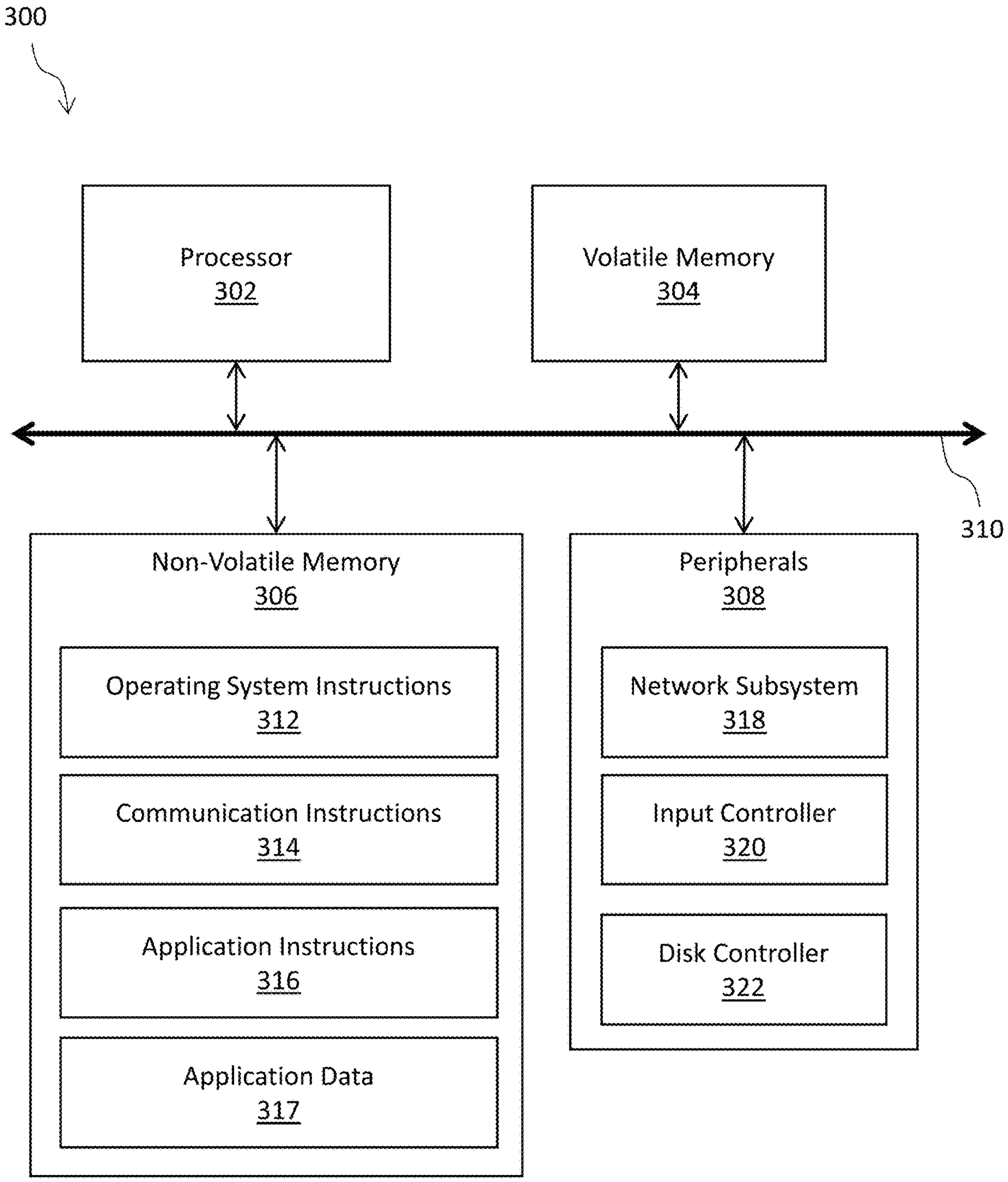
FIG. 3 is server device that can be used within the system of FIG. 1 according to an embodiment of the present disclosure.

FIG. 3 is a diagram of an example server device 300 that can be used within system 100 of FIG. 1. Server device 300 can implement various features and processes as described herein. Server device 300 can be implemented on any electronic device that runs software applications derived from complied instructions, including without limitation personal computers, servers, smart phones, media players, electronic tablets, game consoles, email devices, etc. In some implementations, server device 300 can include one or more processors 302, volatile memory 304, non-volatile memory 306, and one or more peripherals 308. These components can be interconnected by one or more computer buses 310.

Processor(s) 302 can use any known processor technology, including but not limited to graphics processors and multi-core processors. Suitable processors for the execution of a program of instructions can include, by way of example, both general and special purpose microprocessors, and the sole processor or one of multiple processors or cores, of any kind of computer. Bus 310 can be any known internal or external bus technology, including but not limited to ISA, EISA, PCI, PCI Express, USB, Serial ATA, or FireWire. Volatile memory 304 can include, for example, SDRAM. Processor 302 can receive instructions and data from a read-only memory or a random access memory or both. Essential elements of a computer can include a processor for executing instructions and one or more memories for storing instructions and data.

Non-volatile memory 306 can include by way of example semiconductor memory devices, such as EPROM, EEPROM, and flash memory devices; magnetic disks such as internal hard disks and removable disks; magneto-optical disks; and CD-ROM and DVD-ROM disks. Non-volatile memory 306 can store various computer instructions including operating system instructions 312, communication instructions 314, application instructions 316, and application data 317. Operating system instructions 312 can include instructions for implementing an operating system (e.g., Mac OS®, Windows®, or Linux). The operating system can be multi-user, multiprocessing, multitasking, multithreading, real-time, and the like. Communication instructions 314 can include network communications instructions, for example, software for implementing communication protocols, such as TCP/IP, HTTP, Ethernet, telephony, etc. Application instructions 316 can include instructions for various applications. Application data 317 can include data corresponding to the applications.

Peripherals 308 can be included within server device 300 or operatively coupled to communicate with server device 300. Peripherals 308 can include, for example, network subsystem 318, input controller 320, and disk controller 322. Network subsystem 318 can include, for example, an Ethernet of WiFi adapter. Input controller 320 can be any known input device technology, including but not limited to a keyboard (including a virtual keyboard), mouse, track ball, and touch-sensitive pad or display. Disk controller 322 can include one or more mass storage devices for storing data files; such devices include magnetic disks, such as internal hard disks and removable disks; magneto-optical disks; and optical disks.

Figure 4:
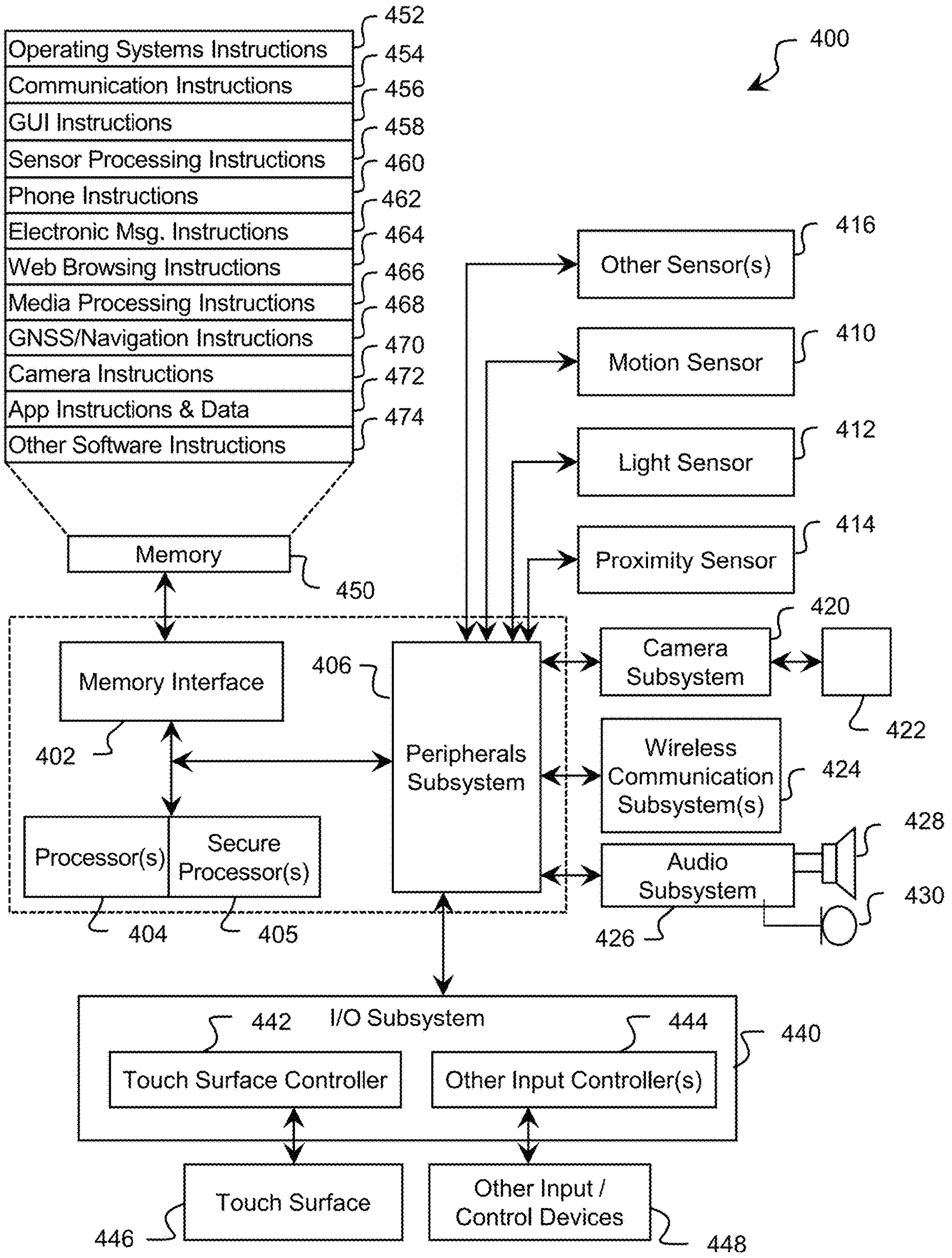
FIG. 4 is an example computing device that can be used within the system of FIG. 1 according to an embodiment of the present disclosure.

FIG. 4 is an example computing device that can be used within the system 100 of FIG. 1, according to an embodiment of the present disclosure. In some embodiments, device 400 can be user device 102. The illustrative user device 400 can include a memory interface 402, one or more data processors, image processors, central processing units 404, and or secure processing units 405, and peripherals subsystem 406. Memory interface 402, one or more central processing units 404 and or secure processing units 405, and or peripherals subsystem 406 can be separate components or can be integrated in one or more integrated circuits. The various components in user device 400 can be coupled by one or more communication buses or signal lines.

Sensors, devices, and subsystems can be coupled to peripherals subsystem 406 to facilitate multiple functionalities. For example, motion sensor 410, light sensor 412, and proximity sensor 414 can be coupled to peripherals subsystem 406 to facilitate orientation, lighting, and proximity functions. Other sensors 416 can also be connected to peripherals subsystem 406, such as a global navigation satellite system (GNSS) (e.g., GPS receiver), a temperature sensor, a biometric sensor, magnetometer, or other sensing device, to facilitate related functionalities.

Camera subsystem 420 and optical sensor 422, e.g., a charged coupled device (CCD) or a complementary metal-oxide semiconductor (CMOS) optical sensor, can be utilized to facilitate camera functions, such as recording photographs and video clips. Camera subsystem 420 and optical sensor 422 can be used to collect images of a user to be used during authentication of a user, e.g., by performing facial recognition analysis.

Communication functions can be facilitated through one or more wired and or wireless communication subsystems 424, which can include radio frequency receivers and transmitters and or optical (e.g., infrared) receivers and transmitters. For example, the Bluetooth (e.g., Bluetooth low energy (BTLE)) and or WiFi communications described herein can be handled by wireless communication subsystems 424. The specific design and implementation of communication subsystems 424 can depend on the communication network(s) over which the user device 400 is intended to operate. For example, user device 400 can include communication subsystems 424 designed to operate over a GSM network, a GPRS network, an EDGE network, a WiFi or WiMax network, and a Bluetooth™ network. For example, wireless communication subsystems 424 can include hosting protocols such that device 400 can be configured as a base station for other wireless devices and or to provide a WiFi service.

Audio subsystem 426 can be coupled to speaker 428 and microphone 430 to facilitate voice-enabled functions, such as speaker recognition, voice replication, digital recording, and telephony functions. Audio subsystem 426 can be configured to facilitate processing voice commands, voice-printing, and voice authentication, for example.

I/O subsystem 440 can include a touch-surface controller 442 and or other input controller(s) 444. Touch-surface controller 442 can be coupled to a touch-surface 446. Touch-surface 446 and touch-surface controller 442 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch-surface 446.

The other input controller(s) 444 can be coupled to other input/control devices 448, such as one or more buttons, rocker switches, thumb-wheel, infrared port, USB port, and or a pointer device such as a stylus. The one or more buttons (not shown) can include an up/down button for volume control of speaker 428 and or microphone 430.

In some implementations, a pressing of the button for a first duration can disengage a lock of touch-surface 446; and a pressing of the button for a second duration that is longer than the first duration can turn power to user device 400 on or off. Pressing the button for a third duration can activate a voice control, or voice command, module that enables the user to speak commands into microphone 430 to cause the device to execute the spoken command. The user can customize a functionality of one or more of the buttons. Touch-surface 446 can, for example, also be used to implement virtual or soft buttons and or a keyboard.

In some implementations, user device 400 can present recorded audio and or video files, such as MP3, AAC, and MPEG files. In some implementations, user device 400 can include the functionality of an MP3 player, such as an iPod™. User device 400 can, therefore, include a 36-pin connector and or 8-pin connector that is compatible with the iPod. Other input/output and control devices can also be used.

Memory interface 402 can be coupled to memory 450. Memory 450 can include high-speed random access memory and or non-volatile memory, such as one or more magnetic disk storage devices, one or more optical storage devices, and or flash memory (e.g., NAND, NOR). Memory 450 can store an operating system 452, such as Darwin, RTXC, LINUX, UNIX, OS X, Windows, or an embedded operating system such as VxWorks.

Operating system 452 can include instructions for handling basic system services and for performing hardware dependent tasks. In some implementations, operating system 452 can be a kernel (e.g., UNIX kernel). In some implementations, operating system 452 can include instructions for performing voice authentication.

Memory 450 can also store communication instructions 454 to facilitate communicating with one or more additional devices, one or more computers and or one or more servers. Memory 450 can include graphical user interface instructions 456 to facilitate graphic user interface processing; sensor processing instructions 458 to facilitate sensor-related processing and functions; phone instructions 460 to facilitate phone-related processes and functions; electronic messaging instructions 462 to facilitate electronic messaging-related process and functions; web browsing instructions 464 to facilitate web browsing-related processes and functions; media processing instructions 466 to facilitate media processing-related functions and processes; GNSS/Navigation instructions 468 to facilitate GNSS and navigation-related processes and instructions; and or camera instructions 470 to facilitate camera-related processes and functions.

Memory 450 can store application (or "app") instructions and data 472, such as instructions for the apps described above in the context of FIGS. 1, 2A, and 2B. Memory 450 can also store other software instructions 474 for various other software applications in place on device 400. The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

The described features can be implemented in one or more computer programs that can be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions can include, by way of example, both general and special purpose microprocessors, and the sole processor or one of multiple processors or cores, of any kind of computer. Generally, a processor can receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

The invention claimed is:

1. A computing system comprising:

a processor; and a non-transitory computer-readable storage device storing computer-executable instructions, the instructions operable to cause the processor to perform operations comprising:

receiving a user query from a user device;

generating a response to the user query;

feeding the query and the response to a large language model (LLM);

generating a summarized response to the user query via the LLM;

causing the summarized response to be displayed on the user device;

determining a persona of a user associated with the user query, the persona comprising knowledge characteristics of the user;

determining one or more reformatting options based on the persona of the user; and causing the one or more reformatting options to be displayed on the user device.

2. The computing system of claim 1, wherein generating the response to the user query comprises analyzing a knowledge base of information stored in a storage device in communication with the processor.

3. The computing system of claim 2, wherein analyzing the knowledge base of information comprises executing a semantic or hybrid vector search within the knowledge base.

4. The computing system of claim 1, wherein generating the response to the user query comprises identifying one or more documents relevant to the user query.

5. The computing system of claim 1, wherein causing the one or more reformatting options to be displayed on the user device comprises causes an option to present a natural language summary of a code snippet.

6. The computing system of claim 1, wherein causing the one or more reformatting options to be displayed on the user device comprises causes an option to convert a code snippet to a different programming language.

7. The computing system of claim 1, wherein the operations further comprise:

receiving a user input from the user device selecting one of the one or more reformatting options;

processing the selected reformatting option; and performing reformatting of the summarized response based on the selected reformatting option.

8. The computing system of claim 7, wherein processing the selected reformatting option comprises analyzing a conversation history to identify a message to be reformatted.

9. The computing system of claim 7, wherein performing the reformatting of the summarized response based on the selected reformatting option comprises reformatting the summarized response via the LLM.

10. A computer-implemented method, performed by at least one processor, comprising:

receiving a user query from a user device;

generating a response to the user query;

feeding the query and the response to a large language model (LLM);

generating a summarized response to the user query via the LLM;

causing the summarized response to be displayed on the user device;

determining a persona of a user associated with the user query, the persona comprising knowledge characteristics of the user;

determining one or more reformatting options based on the persona of the user; and causing the one or more reformatting options to be displayed on the user device.

11. The computer-implemented method of claim 10, wherein generating the response to the user query comprises analyzing a knowledge base of information stored in a storage device in communication with the processor.

12. The computer-implemented method of claim 11, wherein analyzing the knowledge base of information comprises executing a semantic or hybrid vector search within the knowledge base.

13. The computer-implemented method of claim 10, wherein generating the response to the user query comprises identifying one or more documents relevant to the user query.

14. The computer-implemented method of claim 10, wherein causing the one or more reformatting options to be displayed on the user device comprises causes an option to present a natural language summary of a code snippet.

15. The computer-implemented method of claim 10, wherein causing the one or more reformatting options to be displayed on the user device comprises causes an option to convert a code snippet to a different programming language.

16. The computer-implemented method of claim 10 comprising:

receiving a user input from the user device selecting one of the one or more reformatting options;

processing the selected reformatting option; and performing reformatting of the summarized response based on the selected reformatting option.

17. The computer-implemented method of claim 16, wherein processing the selected reformatting option comprises analyzing a conversation history to identify a message to be reformatted.

18. The computer-implemented method of claim 16, wherein performing the reformatting of the summarized response based on the selected reformatting option comprises reformatting the summarized response via the LLM.

* * * * *